(12) United States Patent
Hou et al.

(10) Patent No.: US 7,333,091 B2
(45) Date of Patent: Feb. 19, 2008

(54) ERGONOMIC MOUSE

(75) Inventors: Chuan-Kung Hou, Yonghe (TW);
Cheng-Hua Hsu, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 555 days.

(21) Appl. No.: 11/047,644

(22) Filed: Feb. 2, 2005

(65) Prior Publication Data

US 2006/0170655 A1    Aug. 3, 2006

(51) Int. Cl.
*G09G 5/00* (2006.01)
*G09G 5/08* (2006.01)

(52) U.S. Cl. .................... 345/163; 345/156

(58) Field of Classification Search ......... 345/163–166
See application file for complete search history.

(56) References Cited

U.S. PATENT DOCUMENTS 5,870,081 A * 2/1999 Wu ........................... 345/163
7,233,318 B1 * 6/2007 Farag et al. ................ 345/163

* cited by examiner

*Primary Examiner*—Duc Q Dinh
(74) *Attorney, Agent, or Firm*—Rabin & Berdo, P.C.

(57) ABSTRACT

An ergonomic mouse has a sliding cap matching the curvature of a normal human palm. The sliding cap may be slid on the top of a hollow body to reach a desired operation position, then fine-tuned and anchored. Thus when the mouse is moved during operation, it can absorb reaction forces to avoid hurting the user's wrist and better meet ergonomic requirements.

17 Claims, 7 Drawing Sheets

ERGONOMIC MOUSE

FIELD OF THE INVENTION

The invention relates to an ergonomic mouse, and particularly to a mouse having a sliding cap pivotally mounted onto a hollow body and slidable thereon that may be fine-tuned and anchored to better meet ergonomic requirements.

BACKGROUND OF THE INVENTION

The typical mouse device has a track ball partially exposed on the outside. When the track ball rotates under a force, two wheels that are normal to each other located inside the mouse also rotate. Through optical detection, the rotation speeds of the two wheels are converted to moving distances on a set of coordinates. Hence when an electronic device is connected to the mouse, the cursor on the screen will move relatively from a start position to a destination position.

In order to suit the operation type and computer usage habit of different users, the mouse design is constantly being improved. Nowadays a wide variety of mouse selections are available on the market. Each has its unique functions and features.

Operation of the mouse mainly relies on the user's wrist. Moving the mouse for a prolonged period of time often results in physical pain to users, or even causes injury to the user's wrist. Although most mouse devices adopt an ergonomic design to prevent injury, they generally focus on the ergonomics of the palm for holding the mouse (namely to conform to the normal palm curvature), but rarely consider the ergonomics related to the moving of the mouse. As a result, many reaction forces are not absorbed. Injury to the wrist can still occur.

SUMMARY OF THE INVENTION

In view of the aforesaid problems, the primary object of the invention is to provide an ergonomic mouse. The mouse according to the invention has a sliding cap conforming to the common palm curvature of a human hand. The sliding cap is pivotally coupled to a hollow body and slidable on the top of the hollow body. The sliding cap may be moved to a desired operation position suitable to a user, and be fine-tuned and anchored on the hollow body. Then the mouse can absorb reaction forces while moving to avoid hurting the user's wrist. Thus it can better meet ergonomic requirements.

In order to achieve the foregoing object, the mouse according to the invention includes a hollow body and a sliding cap. The hollow body has a first port and a trough on the top, and a housing section in the interior. The sliding cap has a cap body, an axle and an elastic anchor member. The cap body has a boss running through the first port to pivotally couple the cap body on the top of the hollow body. The axle has two ends located respectively in the cap body and the housing section so that the cap body is turnable about the axle. The elastic anchor member corresponds to the trough to anchor the cap body relative to the hollow body. Hence after the cap body is slid to a desired operation position, it may be fine-tuned and anchored on the hollow body. When the mouse is moved during operation, it can absorb the reaction force to protect the user's wrist from injury. Thus it can better meet ergonomic requirements.

To make the sliding direction of the sliding cap more accurate, the invention further includes stub shafts pivotally located on the top of the hollow body and two opposite sides of the sliding cap to enable the sliding cap to slide forwards and backwards relative to the hollow body, or slide to the leftwards and rightwards, or slide forwards, backwards, leftwards and rightwards.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
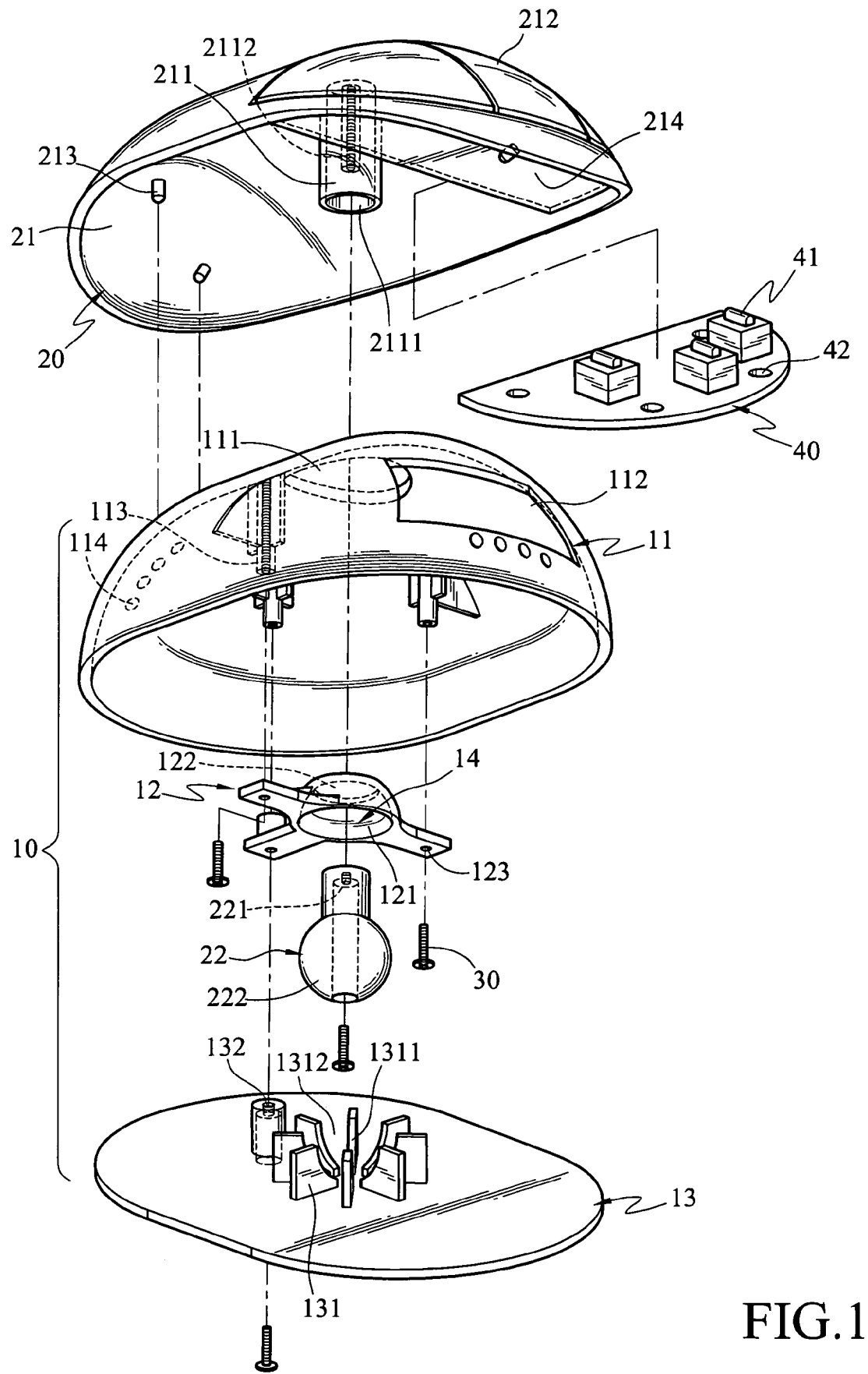
FIG. 1 is an exploded view of the invention.
Figure 2:
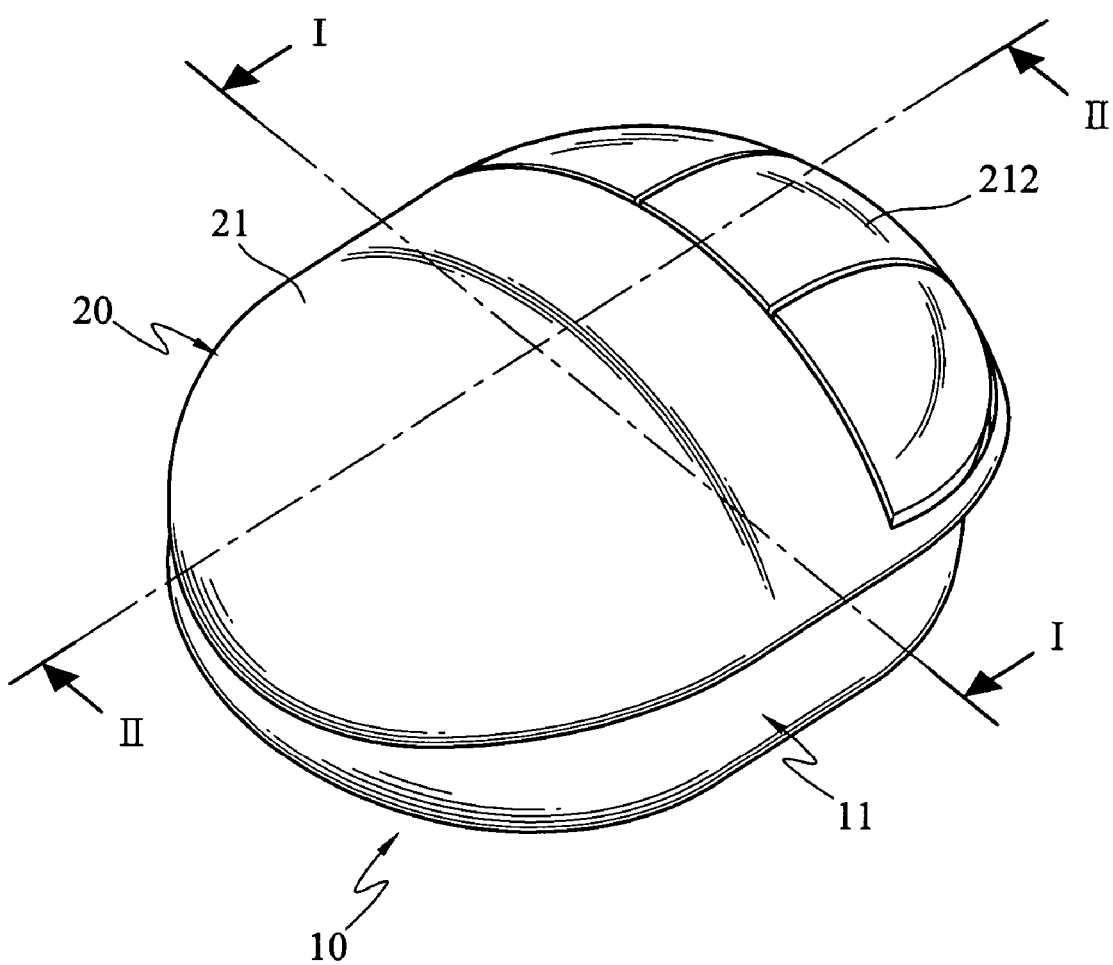
FIG. 2 is a perspective view of the invention.
Figure 3A:
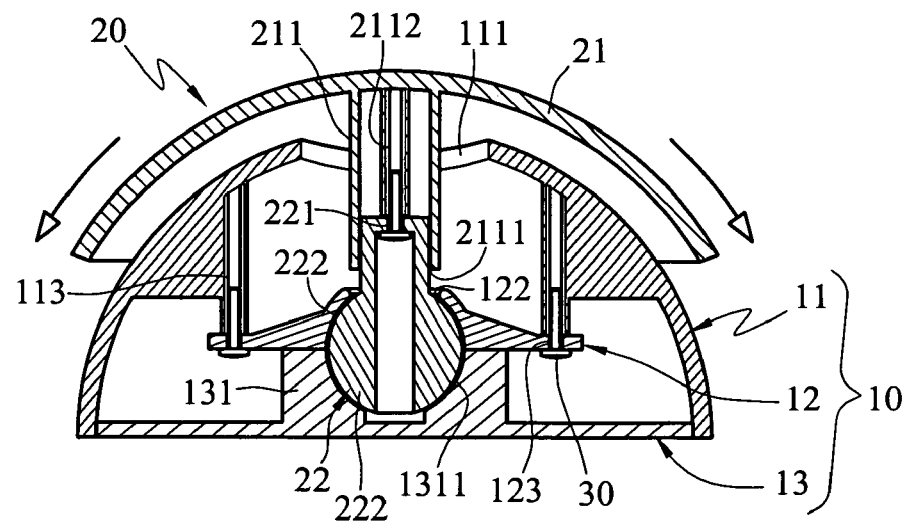
FIG. 3A is a cross-section taken on line I-I in FIG. 2.
Figure 3B:
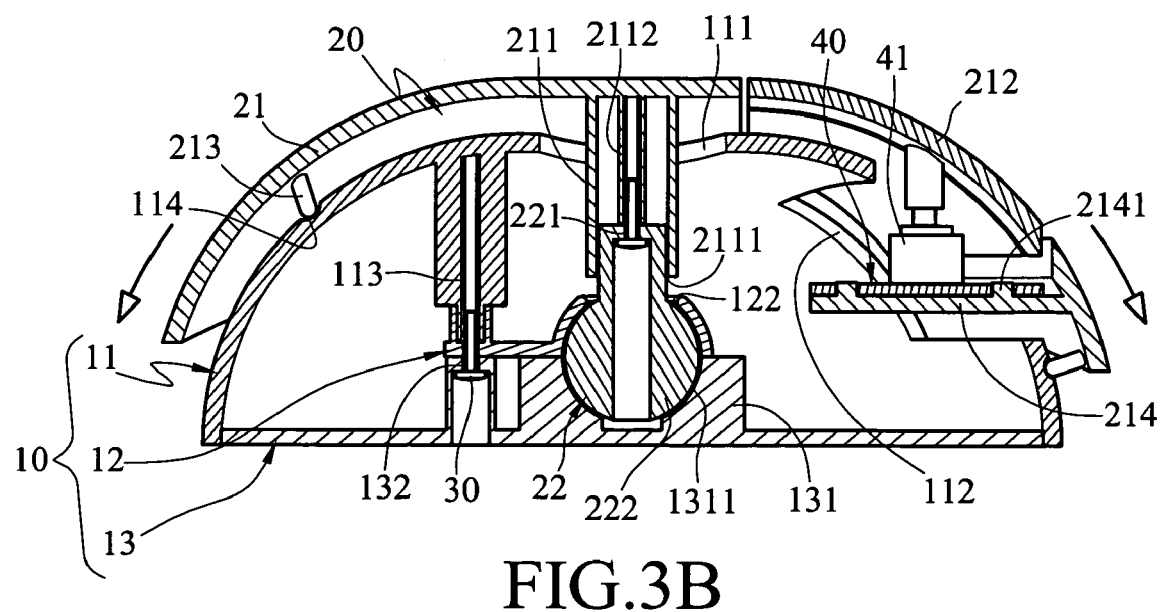
FIG. 3B is a cross-section taken on line II-II in FIG. 2.

Refer to FIG. 1 for an exploded view of the invention, FIG. 2 for a perspective view of the invention, FIG. 3A for a cross-section taken on line I-I in FIG. 2, and FIG. 3B for a cross-section taken on line II-II in FIG. 2. The ergonomic mouse according to the invention includes a hollow body 10 and a sliding cap 20 that is slidable on the top of the hollow body 10 and can be anchored when reaching a desired operation position. Thus the sliding cap 20 may be fine-tuned and anchored on the hollow body 10, so that when the mouse is moved during operation the reaction force may be absorbed to avoid hurting the user's wrist and better meet ergonomic requirements.

The hollow body 10 includes a first shell 11, a retaining member 12 and a second shell 13.

The first shell 11 has a first port 111, a second port 112 and a trough 114 formed on the top, and a first screw hole 113 in the interior.

The retaining member 12 is coupled to the interior of the first shell 11, and has a retaining trough 121, an opening 122 and a second screw hole 123. The opening 122 corresponds to the first port 111. The second screw hole 123 corresponds to the first screw hole 113 and may receive a fastening element 30 to run through the second screw hole 123 and the first screw hole 113 to couple the first shell 11 and the retaining member 12 together.

The second shell 13 is coupled with the first shell 11, and has a plurality of holding members 131. Each of the holding members 131 has an arched notch 1311 to function as a housing trough 1312 corresponding to the retaining trough 121. The housing trough 1312 and the retaining trough 121 jointly form a housing section 14 in the hollow body 10. The second shell 13 has a third screw hole 132 corresponding to the first screw hole 113 to receive a fastening element 30 to run through the third screw hole 132, the second screw hole 123 and the first screw hole 113 to couple the first shell 11, the retaining member 12 and the second shell 13 together. It is also possible to couple the second shell 13 only with the first shell 11 with the fastening element 30 running through the third screw hole 132 and the first screw hole 113 (not shown in the drawings).

The sliding cap 20 includes a cap body 21 and an axle 22. The cap body 21 matches the curvature of a normal human palm and has a boss 211, a button 212, an elastic anchor member 213 and a deck 214. The boss 211 runs through the first port 111, is pivotally coupled to the top of the hollow body 10, and has a coupling cavity 2111 and a fourth screw hole 2112 formed thereon. The coupling cavity 2111 is coupled with the axle 22. The fourth screw hole 2112 is located in the coupling cavity 2111. The button 212 corresponds to the second port 112. The elastic anchor member 213 has elasticity and corresponds to the trough 114. When the cap body 21 is slid to a desired operation position, the elastic anchor member 213 may be wedged in the trough 114 to anchor the cap body 21 on the first shell 11. The deck 214 is located below the button 212 and has a coupling strut 2141 to run through an aperture 42 of a circuit board 40 for mounting the circuit board 40 onto the deck 214, so that a switch 41 on the circuit board 40 may be depressed with the button 212. The second port 112 is formed to a size that allows the deck 214 to be moved relative to the hollow body 10 to a desired angle.

The axle 22 has a fifth screw hole 221 on one end corresponding to the fourth screw hole 2112 to receive a fastening element 30 to run through the fifth screw hole 221 and the fourth screw hole 2112 sequentially to couple the cap body 21 to the axle 22. Of course, the axle 22 has to pass through the opening 122. The axle 22 has the other end forming an axle ball 222, which is located in the housing section 14 and is surrounded to enable the cap 21 to turn about the axle 22.

For assembly of the invention, a fastening element 30 runs through the first screw hole 113 and the second screw hole 123 sequentially to couple the retaining member 12 with the first shell 11. The boss 211 runs through the first port 111. The retaining member 12 has one end running through the opening 122. The fastening element 30 runs through the fourth screw hole 2112 and the fifth screw hole 221 sequentially to couple the cap body 21 to the axle 22. Finally, another fastening element 30 runs through the first screw hole 113, second screw hole 123 and third screw hole 132 sequentially to couple the first shell 11, retaining member 12 and the second shell 13 together.

When the invention is in use, the sliding cap 20 may be slid on the top of the hollow body 10 until reaching a desired operation position. Then the elastic anchor member 213 is wedged in the trough 114 to anchor the position. Thus the sliding cap 20 may be fine-tuned on the hollow body 10 and anchored. When the invention is moved during operation, it can absorb the reaction force to avoid hurting the user's wrist and better meet ergonomic requirements.

Figure 4A:
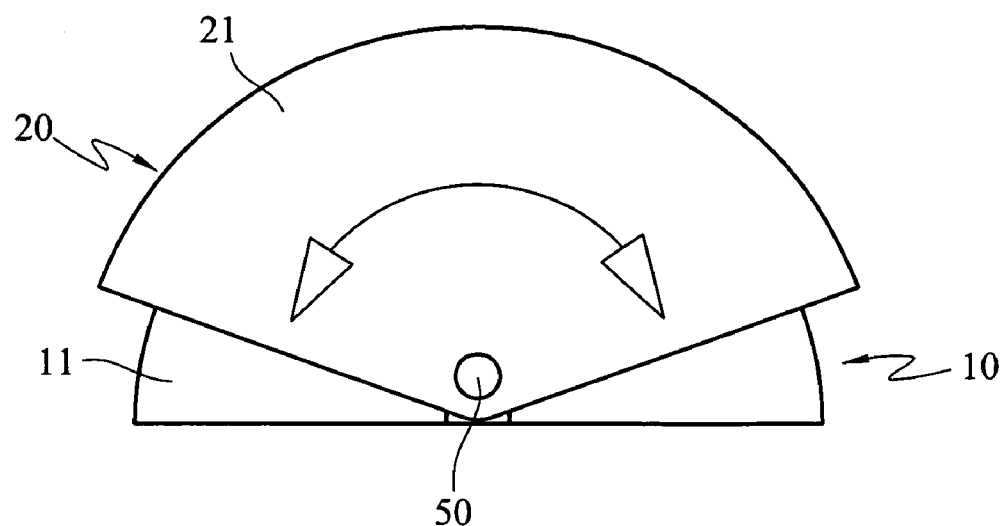
FIGS. 4A and 4B are schematic views of a first embodiment of the stub shaft location.
Figure 4B:
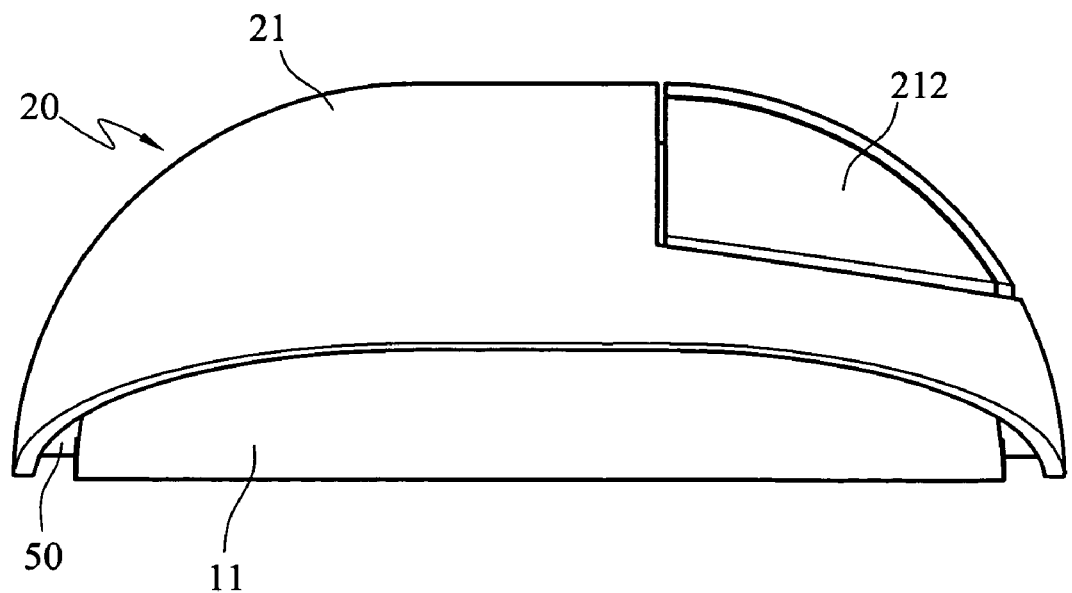
Figure 5A:
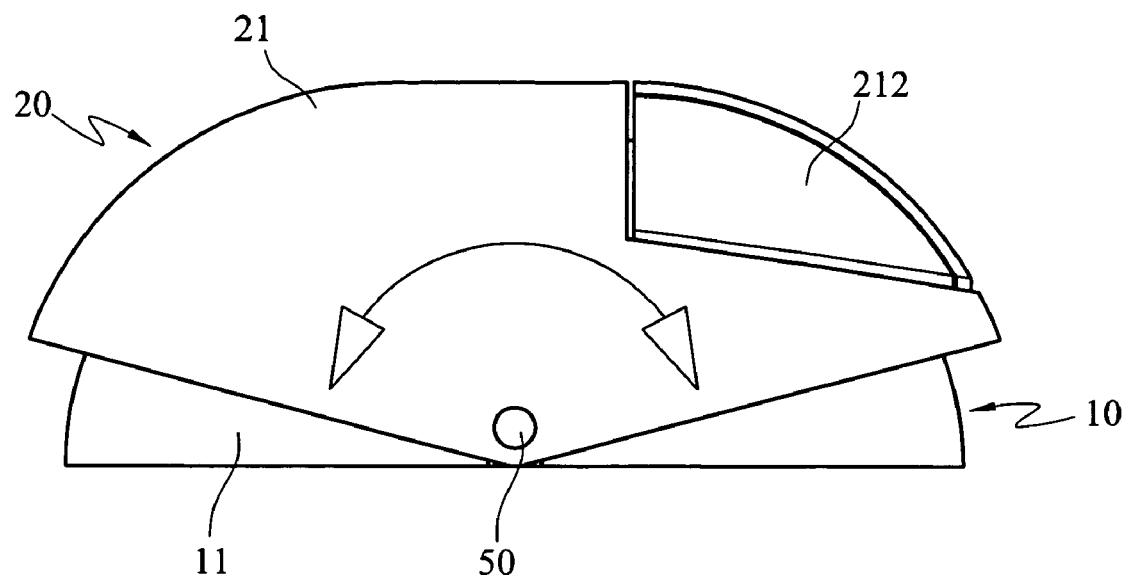
FIGS. 5A and 5B are schematic views of a second embodiment of the stub shaft location.
Figure 5B:
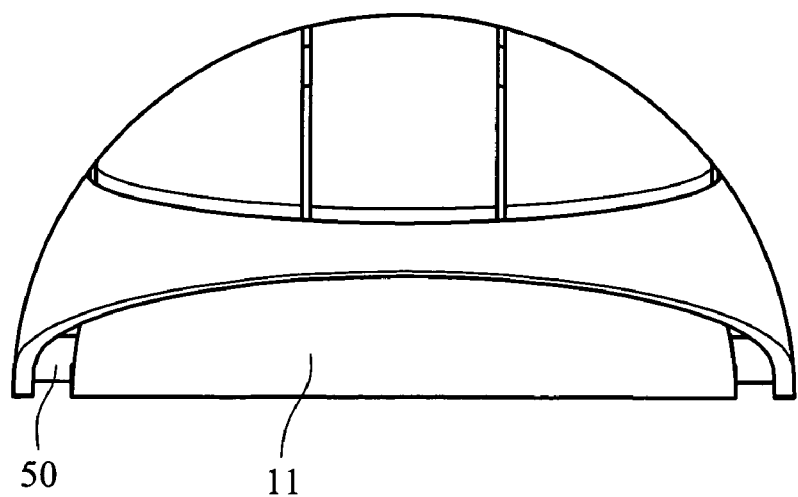

To make the sliding direction of the sliding cap 20 more accurate, stub shafts 50 may be provided on the top of the hollow body 10 and two opposite sides of the sliding cap 20. When sliding the sliding cap 20 to the leftwards and rightwards relative to the hollow body 10, the stub shafts 50 are pivotally located on the front and rear sides of the hollow body 10 and the sliding cap 20, as shown in a first embodiment in FIGS. 4A and 4B. The trough 114 and the elastic anchor member 213 are located on the front side and rear side of the hollow body 10 and the sliding cap 20 (not shown in the drawings). When sliding the sliding cap 20 forwards and backwards relative to the hollow body 10, the stub shafts 50 are pivotally located on the left and right sides of the hollow body 10 and the sliding cap 20, as shown in a second embodiment in FIGS. 5A and 5B. The trough 114 and the elastic anchor member 213 are located on the left side and right side of the hollow body 10 and the sliding cap 20 (not shown in the drawings).

Figure 6A:
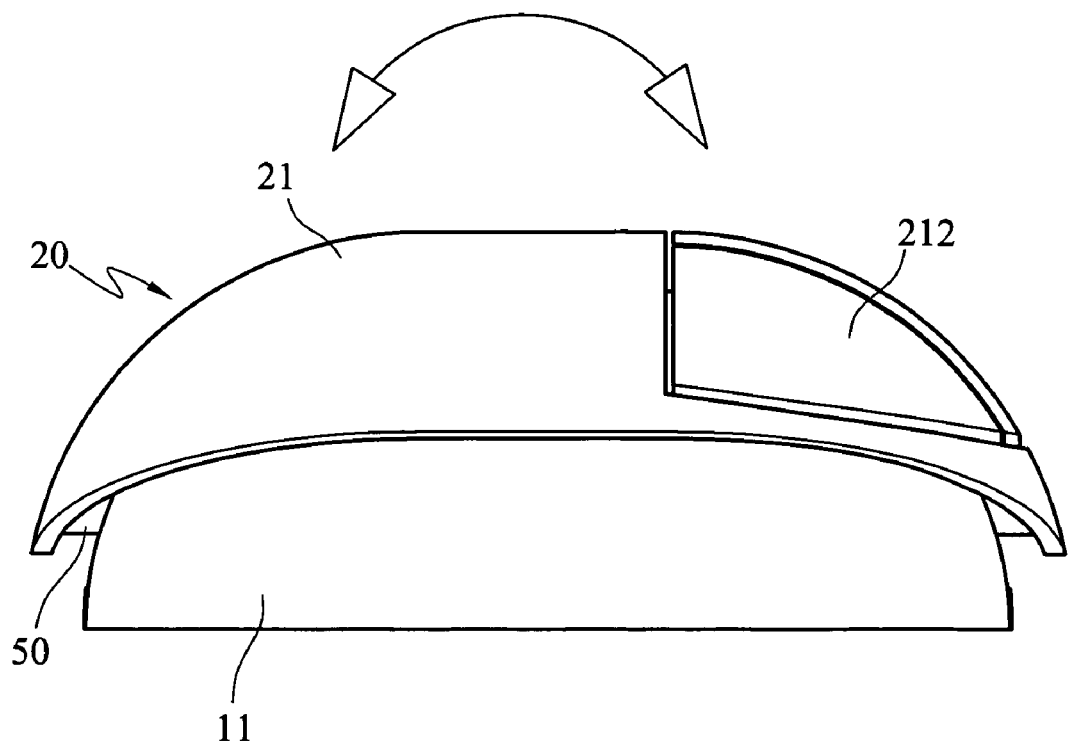
FIGS. 6A and 6B are schematic views of a third embodiment of the stub shaft location.
Figure 6B:
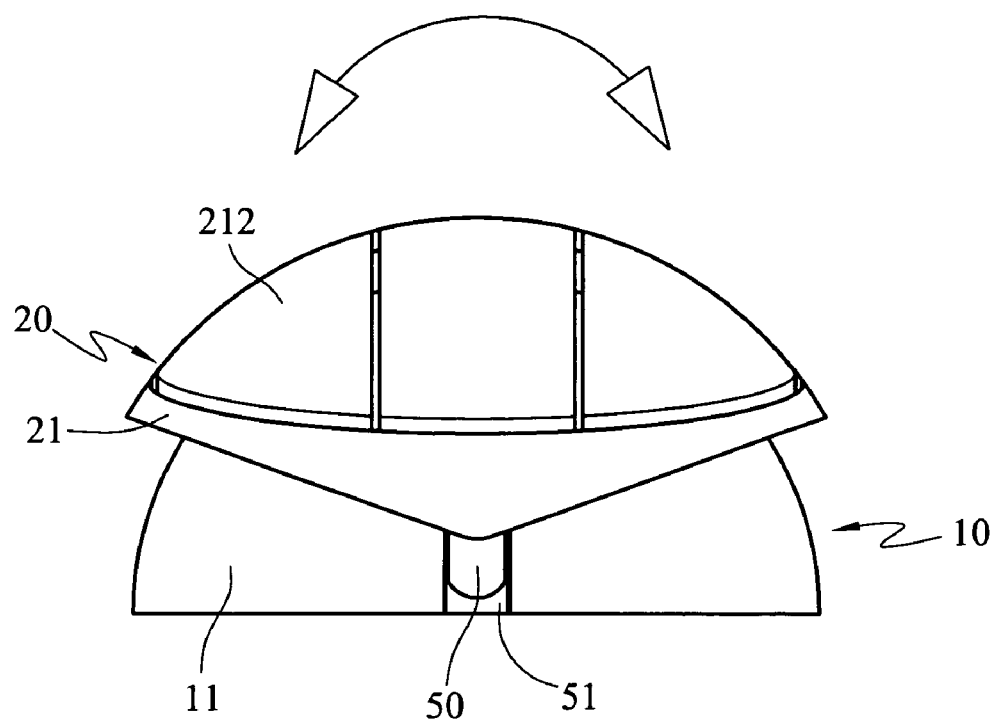
Figure 7A:
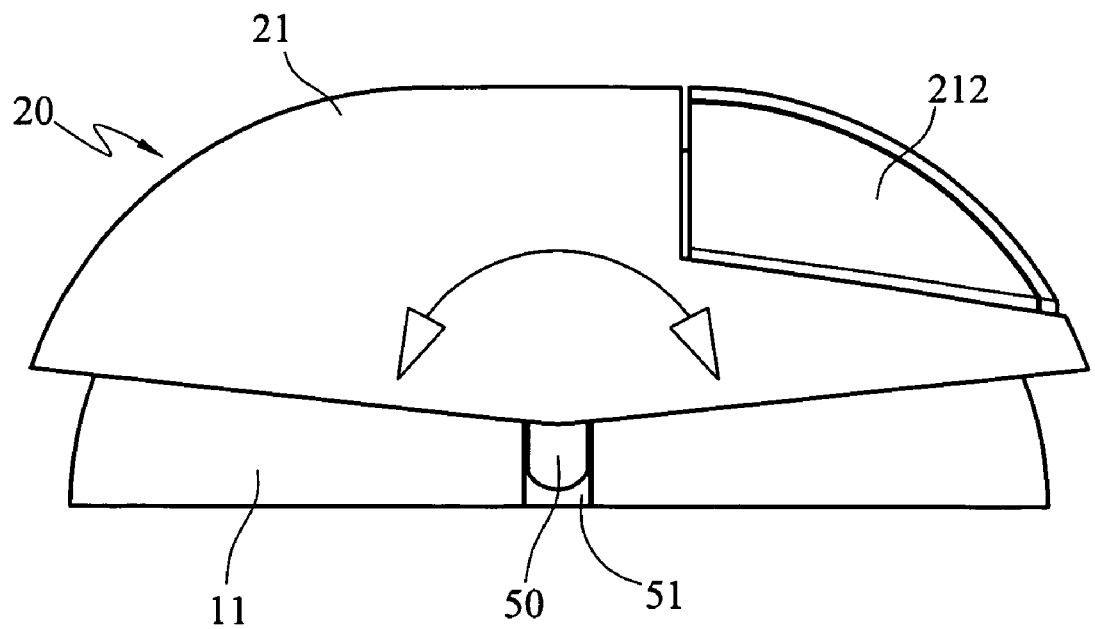
FIGS. 7A and 7B are schematic views of a fourth embodiment of the stub shaft location.
Figure 7B:
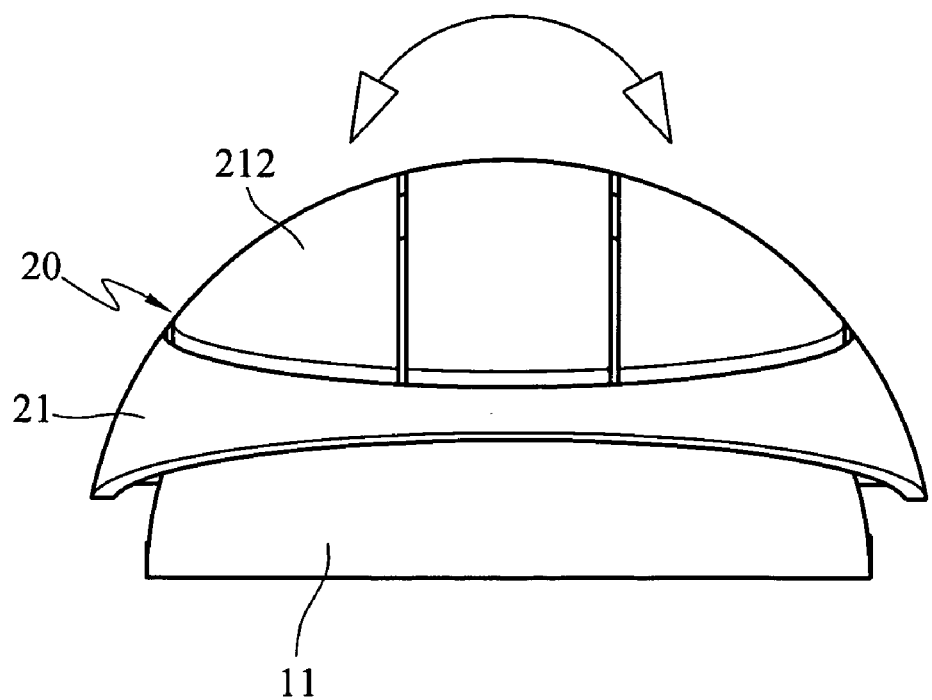

When sliding the sliding cap 20 forwards, backwards, to the leftwards and rightwards relative to the hollow body 10, the stub shafts 50 are pivotally located on the front and rear sides of the hollow body 10 and the sliding cap 20, so that the sliding cap 20 may be slid to the leftwards and rightwards, and the hollow body 10 further has a sliding track 51 on the top to allow the stub shafts 50 to move forwards and backwards, as shown in a third embodiment in FIGS. 6A and 6B. The trough 114 and the elastic anchor member 213 are located on the front side, rear side, left side and right side of the hollow body 10 and the sliding cap 20 (not shown in the drawings). On the other hand, when sliding the sliding cap 20 forwards, backwards, to the leftwards and rightwards relative to the hollow body 10, the stub shafts 50 are pivotally located on the left and right sides of the hollow body 10 and the sliding cap 20, so that the sliding cap 20 may be slid forwards and backwards, and the hollow body 10 further has a sliding track 51 on the top to allow the stub shafts 50 to move to the leftwards and rightwards, as shown in a fourth embodiment in FIGS. 7A and 7B. The trough 114 and the elastic anchor member 213 are located on the front side, rear side, left side and right side of the hollow body 10 and the sliding cap 20 (not shown in the drawings).

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An ergonomic mouse, comprising:
    a hollow body having a first port and a trough on the top and a housing section in the interior; and
    a sliding cap having a cap body, an axle and an elastic anchor member, the cap body having a boss running through the first port to pivotally couple the cap body on the top of the hollow body, the axle having two ends located respectively in the cap body and the housing section to allow the cap body to turn about the axle, the elastic anchor member corresponding to the trough for anchoring the cap body on the hollow body;
    wherein the hollow body includes:
    a first shell which has the first port formed thereon;
    a retaining member coupled to the interior of first shell having a retaining trough corresponding to the axle; and
    a second shell coupled with the first shell having a housing trough corresponding to the retaining trough, the housing trough and the retaining trough jointly forming the housing section; and
    wherein the second shell includes a plurality of housing members each having an arched notch to form the housing trough.

2. The ergonomic mouse of claim 1, wherein the cap body has a button, the first shell having a second port corresponding to the button.

3. The ergonomic mouse of claim 2, wherein the cap body has a deck corresponding to the button and has a coupling strut running through an aperture of a circuit board for holding the circuit board on the deck to allow the button to depress a switch located on the circuit board, the second port being formed to a size that allows the deck to be moved relative to the hollow body to a selected angle.

4. The ergonomic mouse of claim 1, wherein the boss has a coupling cavity to couple with the axle and has a fourth screw hole formed in the coupling cavity, the retaining member having an opening corresponding to the first port to allow the axle to run through, the axle having a fifth screw hole corresponding to the fourth screw hole to receive a fastening element to run through the fifth screw hole and the fourth screw hole sequentially to couple the cap body to the axle.

5. The ergonomic mouse of claim 1, wherein the axle has an axle ball on one end surrounded by the housing section to allow the cap body to turn about the axle.

6. The ergonomic mouse of claim 1, wherein the first shell has a first screw hole, the retaining member having a second screw hole corresponding to the first screw hole to receive a fastening element to run though the second screw hole and the first screw hole sequentially to couple the first shell with the retaining member.

7. The ergonomic mouse of claim 1, wherein the first shell has a first screw hole, the second shell having a third screw hole corresponding to the first screw hole to receive a fastening element to run though the third screw hole and the first screw hole sequentially to couple the first shell with the second shell.

8. The ergonomic mouse of claim 1, wherein the first shell has a first screw hole, the retaining member having a second screw hole corresponding to the first screw hole, the second shell having a third screw hole corresponding to the first screw hole to receive a fastening element to run though the third screw hole, the second screw hole and the first screw hole sequentially to couple the first shell, the retaining member and the second shell together.

9. The ergonomic mouse of claim 1, further having two stub shafts pivotally coupled to the top of the hollow body and two opposite sides of the sliding cap.

10. The ergonomic mouse of claim 9, wherein the two stub shafts are pivotally coupled to the top of the hollow body and a front side and a rear side of the sliding cap.

11. The ergonomic mouse of claim 10, wherein the trough and the elastic anchor member are located on the front side and the rear side of the hollow body and the sliding cap.

12. The ergonomic mouse of claim 9, wherein the two stub shafts are pivotally coupled to the top of the hollow body and a left side and a right side of the sliding cap.

13. The ergonomic mouse of claim 12, wherein the trough and the elastic anchor member are located on the left side and the right side of the hollow body and the sliding cap.

14. The ergonomic mouse of claim 9, wherein the two stub shafts are pivotally coupled to the top of the hollow body and a front side and a rear side of the sliding cap, the hollow body having a sliding track on the top to allow the stub shafts to move forwards and backwards along the sliding track.

15. The ergonomic mouse of claim 14, wherein the trough and the elastic anchor member are located on the front side, the rear side, a left side and a right side of the hollow body and the sliding cap.

16. The ergonomic mouse of claim 9, wherein the two stub shafts are pivotally coupled to the top of the hollow body and a left side and a right side of the sliding cap, the hollow body having a sliding track on the top to allow the stub shafts to move leftwards and rightwards along the sliding track.

17. The ergonomic mouse of claim 16, wherein the trough and the elastic anchor member are located on a front side, a rear side, the left side and the right side of the hollowbody and the sliding cap.

* * * * *